United States Patent
Jammoussi et al.

(10) Patent No.: US 9,500,151 B2
(45) Date of Patent: *Nov. 22, 2016

(54) NON-INTRUSIVE EXHAUST GAS SENSOR MONITORING

(71) Applicant: Ford Global Technologies, LLC, Dearborn, MI (US)

(72) Inventors: Hassene Jammoussi, Dearborn, MI (US); Imad Hassan Makki, Dearborn Heights, MI (US); Adam Nathan Banker, Canton, MI (US); Michael Casedy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/174,806

(22) Filed: Feb. 6, 2014

(65) Prior Publication Data

US 2015/0219033 A1 Aug. 6, 2015

(51) Int. Cl.
| | |
|---|---|
| *G06F 7/00* | (2006.01) |
| *F02D 41/14* | (2006.01) |
| *G01M 15/10* | (2006.01) |
| *F02D 41/22* | (2006.01) |
| *F02D 41/08* | (2006.01) |
| *F02D 41/28* | (2006.01) |

(52) U.S. Cl.
CPC ....... *F02D 41/1495* (2013.01); *F02D 41/1454* (2013.01); *F02D 41/222* (2013.01); *G01M 15/104* (2013.01); *F02D 41/08* (2013.01); *F02D 2041/228* (2013.01); *F02D 2041/286* (2013.01); *Y02T 10/40* (2013.01)

(58) Field of Classification Search
USPC ................ 701/104, 109, 114; 123/688, 703; 73/114.71, 114.72; 60/276
See application file for complete search history.

(56) References Cited

U.S. PATENT DOCUMENTS

| | | | | |
|---|---|---|---|---|
| 6,131,446 | A * | 10/2000 | Schnaibel et al. | 73/114.73 |
| 9,074,513 | B2 * | 7/2015 | Makki | F01N 11/00 |
| 2005/0061067 | A1 * | 3/2005 | Maki | F02D 41/1454 |
| | | | | 73/114.74 |
| 2005/0262828 | A1 | 12/2005 | Iihoshi et al. | |
| 2008/0122228 | A1 * | 5/2008 | Liu | B60K 6/48 |
| | | | | 290/40 C |
| 2009/0182490 | A1 * | 7/2009 | Saunders | 701/114 |
| 2010/0242569 | A1 * | 9/2010 | Kerns | F01N 11/007 |
| | | | | 73/1.06 |
| 2013/0180509 | A1 | 7/2013 | Makki et al. | |
| 2013/0180510 | A1 | 7/2013 | Makki et al. | |
| 2013/0231844 | A1 | 9/2013 | Uhrich et al. | |

OTHER PUBLICATIONS

Jammoussi, Hassene et al., "Exhaust Gas Sensor Diagnosis and Controls Adaptation," U.S. Appl. No. 13/779,349, filed Feb. 27, 2013, 45 pages.
Jammoussi, Hassene et al., "Exhaust Gas Sensor Controls Adaptation for Asymmetric Degradation Responses," U.S. Appl. No. 13/901,441, filed May 23, 2013, 40 pages.
Styles, Daniel J. et al., "Exhaust Gas Sensor Diagnosis and Controls Adaptation," U.S. Appl. No. 13/961,628, filed Aug. 7, 2013, 35 pages.

* cited by examiner

*Primary Examiner* — Hung Q Nguyen
*Assistant Examiner* — Ruben Picon-Feliciano
(74) *Attorney, Agent, or Firm* — Julia Voutyras; Alleman Hall McCoy Russell & Tuttle LLP

(57) ABSTRACT

A method for monitoring an exhaust gas sensor coupled in an engine exhaust is provided. In one embodiment, the method comprises indicating exhaust gas sensor degradation based on shape of a distribution of extreme values of a plurality of sets of lambda differentials collected during selected operating conditions. In this way, the exhaust gas sensor may be monitored in a non-intrusive manner.

19 Claims, 9 Drawing Sheets

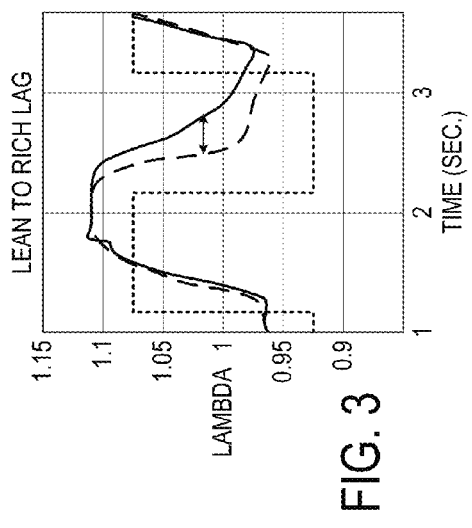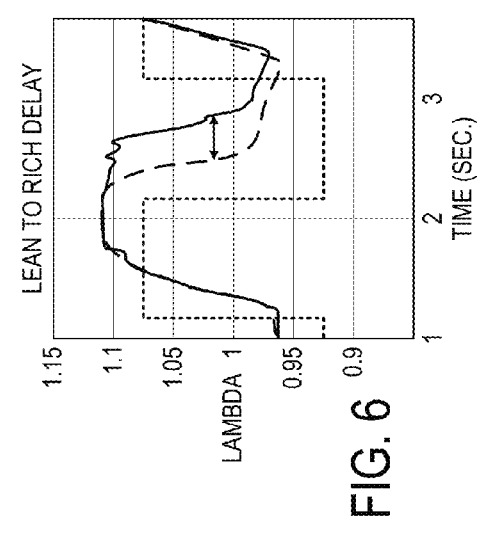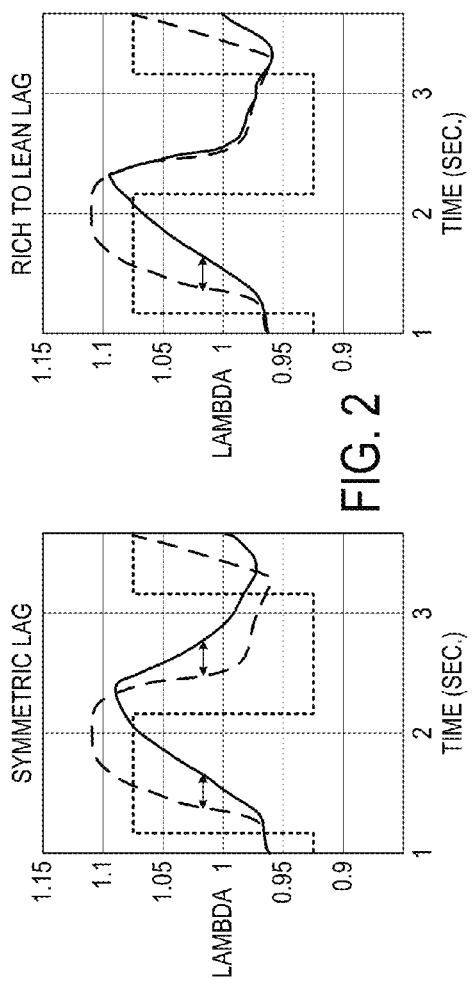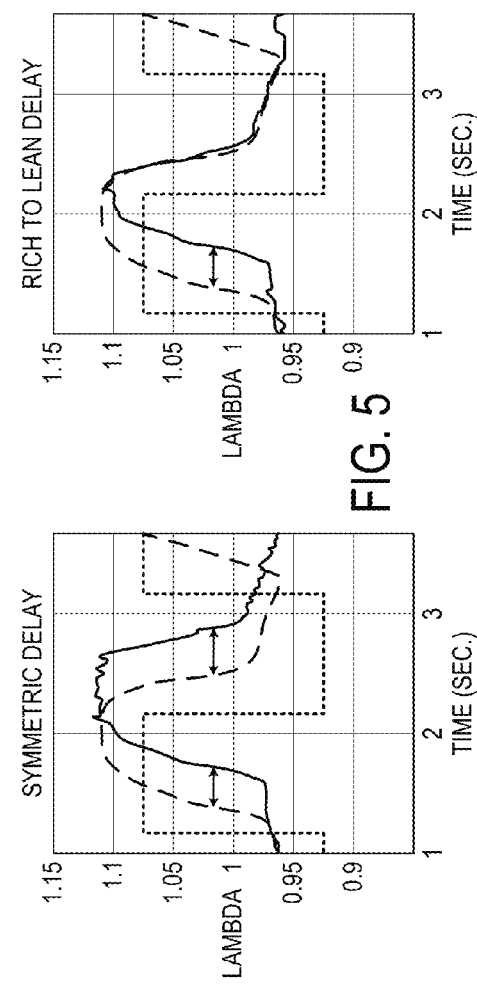

NON-INTRUSIVE EXHAUST GAS SENSOR MONITORING

FIELD

The present disclosure relates to an exhaust gas sensor in a motor vehicle.

BACKGROUND AND SUMMARY

An exhaust gas sensor may be positioned in an exhaust system of a vehicle to detect an air/fuel ratio of exhaust gas exhausted from an internal combustion engine of the vehicle. The exhaust gas sensor readings may be used to control operation of the internal combustion engine to propel the vehicle.

Degradation of an exhaust gas sensor may cause engine control degradation that may result in increased emissions and/or reduced vehicle drivability. Accordingly, accurate determination of exhaust gas sensor degradation may reduce the likelihood of engine control based on readings from a degraded exhaust gas sensor. In particular, an exhaust gas sensor may exhibit six discrete types of degradation behavior. The degradation behavior types may be categorized as asymmetric type degradation (e.g., rich-to-lean asymmetric delay, lean-to-rich asymmetric delay, rich-to-lean asymmetric slow response, lean-to-rich asymmetric slow response) that affects only lean-to-rich or rich-to-lean exhaust gas sensor response rates, or symmetric type degradation (e.g., symmetric delay, symmetric slow response) that affects both lean-to-rich and rich-to-lean exhaust gas sensor response rates. The delay type degradation behaviors may be associated with the initial reaction of the exhaust gas sensor to a change in exhaust gas composition and the slow response type degradation behaviors may be associated with a duration after an initial exhaust gas sensor response to transition from a rich-to-lean or lean-to-rich exhaust gas sensor output.

Previous approaches to monitoring exhaust gas sensor degradation, particularly identifying one or more of the six degradation behaviors, have relied on intrusive data collection. That is, an engine may be purposely operated with one or more rich to lean or lean to rich transitions to monitor exhaust gas sensor response. However, these excursions may be restricted to particular operating conditions that do not occur frequently enough to accurately monitor the sensor, such as during deceleration fuel shut off conditions. Further, these excursions may increase engine operation at non-desired air/fuel ratios that result in increased fuel consumption and/or increased emissions.

The inventors herein have recognized the above issues and identified a non-intrusive approach with reduced computational requirements for determining exhaust gas sensor degradation. In one embodiment, a method includes indicating exhaust gas sensor degradation based on a shape of a distribution of extreme values of a plurality of sets of lambda differentials collected during selected operating conditions, the shape identified based on an iterative search that successively narrows a range of values inside which the shape exists.

In this way, exhaust gas sensor degradation may be indicated by monitoring characteristics of a distribution of extreme values from multiple sets of successive lambda samples in steady state operating conditions. In one example, the characteristics may be a shape of a generalized extreme value (GEV) distribution of the extreme lambda differentials collected during steady state operating conditions, the shape determined iteratively via a golden section search. Asymmetric delay or asymmetric slow response degradation may be determined in this way with reduced computational resources.

By determining degradation of an exhaust gas sensor using a non-intrusive approach with data collected during selected operating conditions, exhaust gas sensor degradation monitoring may be performed in a simple manner. Further, by using the exhaust gas sensor output to determine which of the seven degradation behaviors the sensor exhibits, closed loop feedback control may be improved by tailoring engine control (e.g., fuel injection amount and/or timing) responsive to indication of the particular degradation behavior of the exhaust gas sensor to reduce the impact on vehicle drivability and/or emissions due to exhaust gas sensor degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows a graph indicating a symmetric lag or slow response type degradation behavior of an exhaust gas sensor.

FIG. 3 shows a graph indicating an asymmetric rich-to-lean lag or slow response type degradation behavior of an exhaust gas sensor.

FIG. 4 shows a graph indicating an asymmetric lean-to-rich lag or slow response type degradation behavior of an exhaust gas sensor.

FIG. 5 show a graph indicating a symmetric delay type degradation behavior of an exhaust gas sensor.

FIG. 6 shows a graph indicating an asymmetric rich-to-lean delay type degradation behavior of an exhaust gas sensor.

FIG. 7 shows a graph indicating an asymmetric lean-to-rich delay type degradation behavior of an exhaust gas sensor.

DETAILED DESCRIPTION

The following description relates to an approach for determining degradation of an exhaust gas sensor. More particularly, the systems and methods described below may be implemented to determine exhaust gas sensor degradation based on recognition of any one of six discrete types of behavior associated with exhaust gas sensor degradation.

Figure 1:
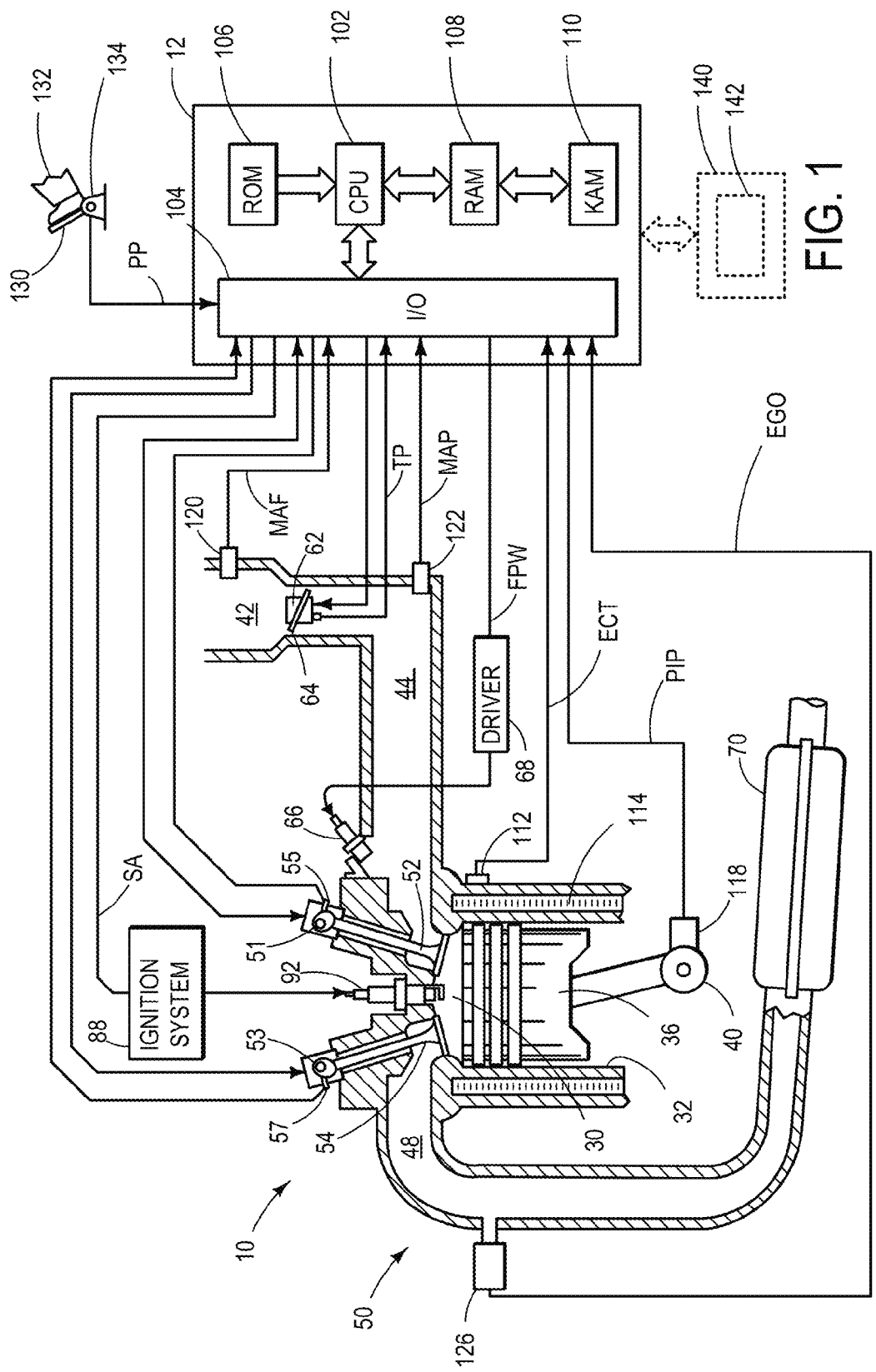
FIG. 1 shows a schematic diagram of an embodiment of a propulsion system of a vehicle including an exhaust gas sensor.

FIG. 1 is a schematic diagram showing one cylinder of multi-cylinder engine 10, which may be included in a propulsion system of a vehicle in which an exhaust gas sensor 126 may be utilized to determine an air fuel ratio of exhaust gas produce by engine 10. The air fuel ratio (along with other operating parameters) may be used for feedback control of engine 10 in various modes of operation. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 of exhaust system 50 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some embodiments, exhaust gas sensor 126 may be a first one of a plurality of exhaust gas sensors positioned in the exhaust system. For example, additional exhaust gas sensors may be positioned downstream of emission control 70.

Emission control device 70 is shown arranged along exhaust passage 48 downstream of exhaust gas sensor 126. Device 70 may be a three way catalyst (TWC), NOx trap, various other emission control devices, or combinations thereof. In some embodiments, emission control device 70 may be a first one of a plurality of emission control devices positioned in the exhaust system. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Furthermore, at least some of the above described signals may be used in the exhaust gas sensor degradation determination method described in further detail below. For example, the inverse of the engine speed may be used to determine delays associated with the injection—intake—compression—expansion—exhaust cycle. As another example, the inverse of the velocity (or the inverse of the MAF signal) may be used to determine a delay associated with travel of the exhaust gas from the exhaust valve 54 to exhaust gas sensor 126. The above described examples along with other use of engine sensor signals may be used to determine the time delay between a change in the commanded air fuel ratio and the exhaust gas sensor response rate.

In some embodiments, exhaust gas sensor degradation determination may be performed in a dedicated controller 140. Dedicated controller 140 may include processing resources 142 to handle signal-processing associated with production, calibration, and validation of the degradation determination of exhaust gas sensor 126. In particular, a sample buffer (e.g., generating approximately 100 samples per second per engine bank) utilized to record the response rate of the exhaust gas sensor may be too large for the processing resources of a powertrain control module (PCM) of the vehicle. Accordingly, dedicated controller 140 may be operatively coupled with controller 12 to perform the exhaust gas sensor degradation determination. Note that dedicated controller 140 may receive engine parameter signals from controller 12 and may send engine control signals and degradation determination information among other communications to controller 12.

Note storage medium read-only memory 106 and/or processing resources 142 can be programmed with computer readable data representing instructions executable by processor 102 and/or dedicated controller 140 for performing the methods described below as well as other variants.

As discussed above, exhaust gas sensor degradation may be determined based on any one, or in some examples each, of six discrete behaviors indicated by delays in the response rate of air/fuel ratio readings generated by an exhaust gas sensor during rich-to-lean transitions and/or lean-to-rich transitions. FIGS. 2-7 each show a graph indicating one of the six discrete types of exhaust gas sensor degradation behaviors. The graphs plot air/fuel ratio (lambda) versus time (in seconds). In each graph, the dotted line indicates a commanded lambda signal that may be sent to engine components (e.g., fuel injectors, cylinder valves, throttle, spark plug, etc.) to generate an air/fuel ratio that progresses through a cycle comprising one or more lean-to-rich transitions and one or more rich-to-lean transitions. In each graph, the dashed line indicates an expected lambda response time of an exhaust gas sensor. In each graph, the solid line indicates a degraded lambda signal that would be produced by a degraded exhaust gas sensor in response to the commanded lambda signal. In each of the graphs, the double arrow lines indicate where the given degradation behavior type differs from the expected lambda signal.

FIG. 2 shows a graph indicating a first type of degradation behavior that may be exhibited by a degraded exhaust gas sensor. This first type of degradation behavior is a symmetric slow response type that includes slow exhaust gas sensor response to the commanded lambda signal for both rich-to-lean and lean-to-rich modulation. In other words, the degraded lambda signal may start to transition from rich-to-lean and lean-to-rich at the expected times but the response rate may be lower than the expected response rate, which results in reduced lean and rich peak times.

FIG. 3 shows a graph indicating a second type of degradation behavior that may be exhibited by a degraded exhaust gas sensor. The second type of degradation behavior is an asymmetric rich-to-lean slow response type that includes slow exhaust gas sensor response to the commanded lambda signal for a transition from rich-to-lean air/fuel ratio. This behavior type may start the transition from rich-to-lean at the expected time but the response rate may be lower than the expected response rate, which may result in a reduced lean peak time. This type of behavior may be considered asymmetric because the response of the exhaust gas sensor is slow (or lower than expected) during the transition from rich-to-lean.

FIG. 4 shows a graph indicating a third type of degradation behavior that may be exhibited by a degraded exhaust gas sensor. The third type of behavior is an asymmetric lean-to-rich slow response type that includes slow exhaust gas sensor response to the commanded lambda signal for a transition from lean-to-rich air/fuel ratio. This behavior type may start the transition from lean-to-rich at the expected time but the response rate may be lower than the expected response rate, which may result in a reduced rich peak time. This type of behavior may be considered asymmetric because the response of the exhaust gas sensor is only slow (or lower than expected) during the transition from lean-to-rich.

FIG. 5 shows a graph indicating a fourth type of degradation behavior that may be exhibited by a degraded exhaust gas sensor. This fourth type of degradation behavior is a symmetric delay type that includes a delayed response to the commanded lambda signal for both rich-to-lean and lean-to-rich modulation. In other words, the degraded lambda signal may start to transition from rich-to-lean and lean-to-rich at times that are delayed from the expected times, but the respective transition may occur at the expected response rate, which results in shifted lean and rich peak times.

FIG. 6 shows a graph indicating a fifth type of degradation behavior that may be exhibited by a degraded exhaust gas sensor. This fifth type of degradation behavior is an asymmetric rich-to-lean delay type that includes a delayed response to the commanded lambda signal from the rich-to-lean air/fuel ratio. In other words, the degraded lambda signal may start to transition from rich-to-lean at a time that is delayed from the expected time, but the transition may occur at the expected response rate, which results in shifted and/or reduced lean peak times. This type of behavior may be considered asymmetric because the response of the exhaust gas sensor is only delayed from the expected start time during a transition from rich-to-lean.

FIG. 7 shows a graph indicating a sixth type of degradation behavior that may be exhibited by a degraded exhaust gas sensor. This sixth type of behavior is an asymmetric lean-to-rich delay type that includes a delayed response to the commanded lambda signal from the lean-to-rich air/fuel ratio. In other words, the degraded lambda signal may start to transition from lean-to-rich at a time that is delayed from the expected time, but the transition may occur at the expected response rate, which results in shifted and/or reduced rich peak times. This type of behavior may be considered asymmetric because the response of the exhaust gas sensor is only delayed from the expected start time during a transition from lean-to-rich.

Figure 8:
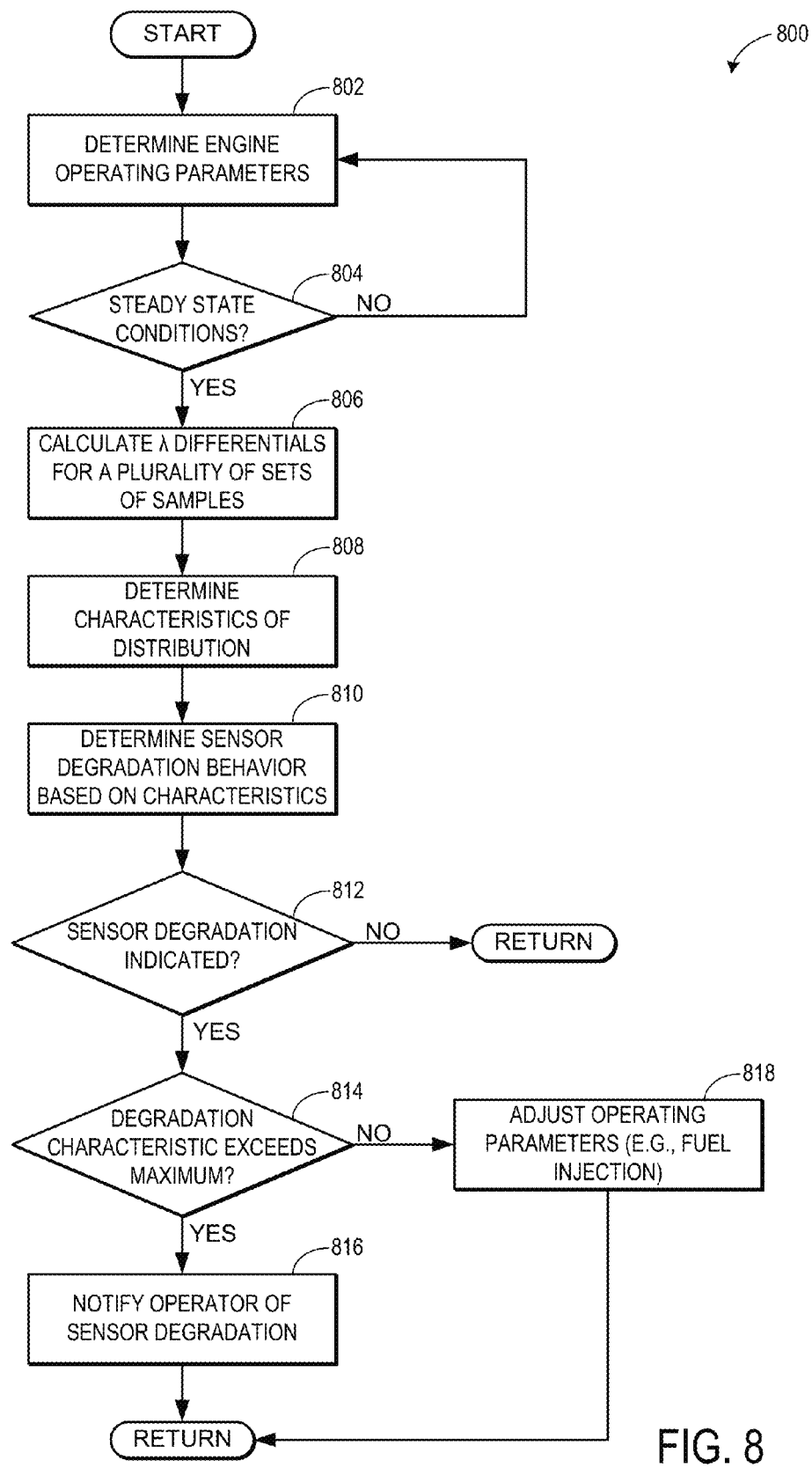
FIGS. 8 and 9 show flow charts illustrating methods for determining exhaust gas sensor degradation behavior according to an embodiment of the present disclosure.
Figure 9:
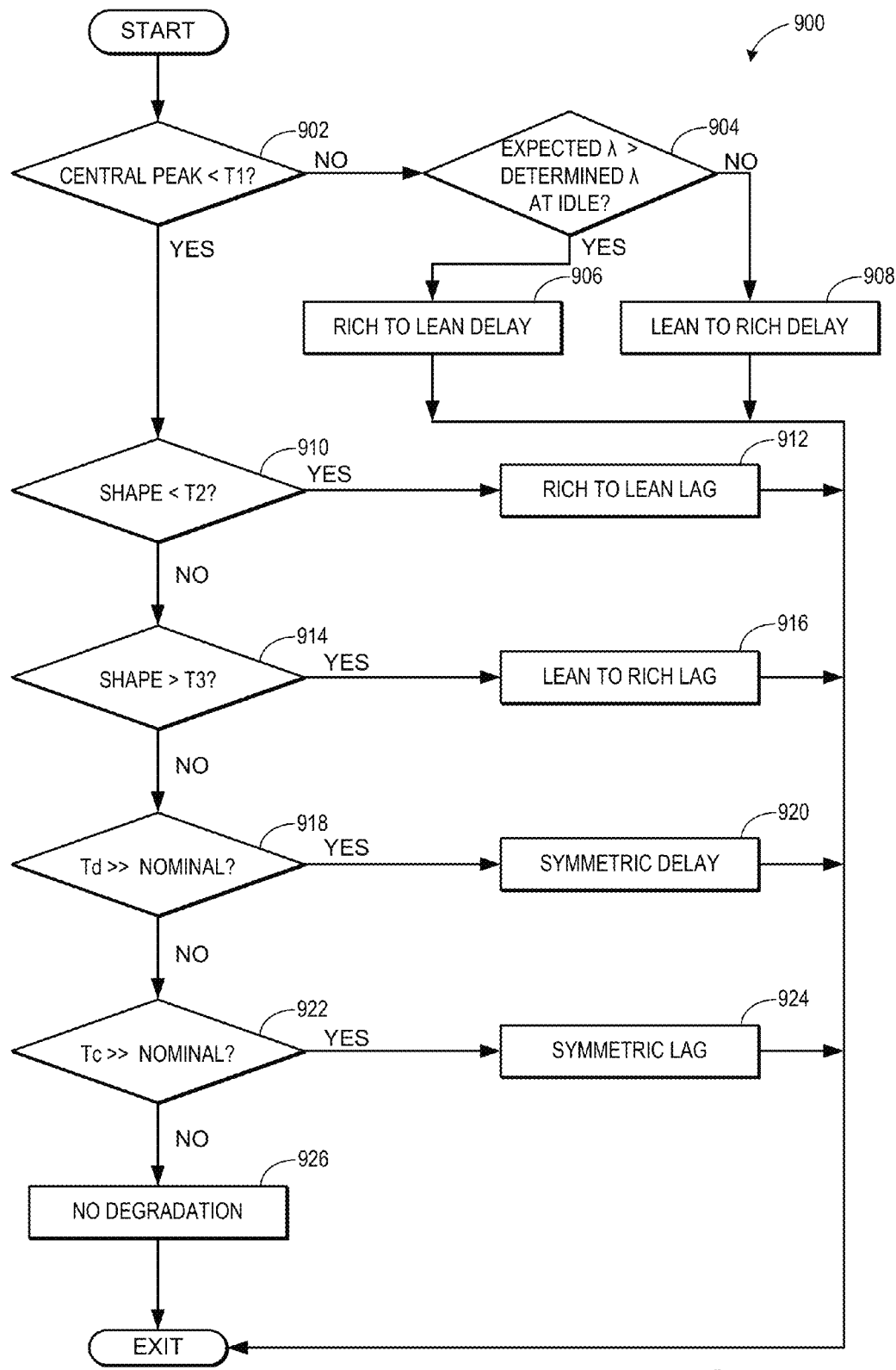

Turning now to FIGS. 8-9, example methods for determining an exhaust gas sensor degradation behavior are depicted according to an embodiment of the present disclosure. FIG. 8 includes a method 800 for monitoring an exhaust gas sensor coupled in an engine exhaust. Method 800 may be carried out by a control system of a vehicle, such as controller 12 and/or dedicated controller 140, to monitor a sensor such as exhaust gas sensor 126. FIG. 9 includes a method 900 that may be carried out as part of FIG. 8 for determining a sensor degradation behavior based on characteristics of a distribution of extreme values of a plurality of data sets. These characteristics, which will be explained in more detail below, are depicted in the example graphs illustrated in FIGS. 12A and 12B.

Referring specifically to FIG. 8, at 802, method 800 includes determining engine operating parameters. Engine operating parameters may be determined based on feedback from various engine sensors, and may include engine speed, load, air/fuel ratio, temperature, etc. Further, engine operating parameters may be determined over a given duration, e.g., 10 seconds, in order to determine whether certain engine operating conditions are changing, or whether the engine is operating under steady-state conditions. As such, method 800 includes, at 804, determining if the engine is operating in steady-state conditions based on the determined engine operating parameters. Steady-state conditions may be determined based on certain operating parameters changing less than a threshold amount during the given duration. In one example, steady-state conditions may be indicated if the engine is operating at idle, or if engine speed varies by less than 20%, engine load varies by less than 30%, and engine air/fuel ratio varies by less than 0.15. In some embodiments, steady-state conditions may also include engine temperature varying by less than a threshold amount, or engine temperature being above a threshold amount. This may avoid monitoring the sensor during cold engine operation, when the sensor may not be heated and thus may not be producing accurate output.

If it is determined at 804 that the engine is not operating in steady-state conditions, method 800 returns to 802 to continue to determine engine operating parameters. If steady state conditions are determined, method 800 proceeds to 806 to calculate air/fuel ratio, or lambda, differentials for a given duration based on readings from the exhaust gas sensor being monitored (e.g., sensor 126). Lambda may be determined for a given number of samples over a given time duration, for example samples may be collected at a rate of 1 sample/96 ms for 60 seconds. For each sample, the difference between that determined lambda and the previous lambda may be calculated and stored in the memory of the controller.

A statistics based method has been presented to non-intrusively diagnose the operation of a UEGO sensor based on the measured A/F ratio from the sensor.

In presence of one of the six possible faults, the sensor response may either be 1. Symmetric (in cases of symmetric delay, symmetric filter or No Fault)

2. Asymmetric delay (Lean to Rich delay or Rich to Lean Delay)

3. Asymmetric lag (Lean to Rich filter or Rich to Lean filter) Symmetric delay (SYMD), symmetric filter (SYMF), rich to lean filter (R2LF), lean to rich filter (L2RF), rich to lean delay (R2LD), and lean to rich delay (L2RD).

By observing the distribution function of a sample of differential data from the sensor where the population data is defined as $$X_p = \Delta\lambda(k)|_{2<k<n}$$
$$= [\lambda(2)-\lambda(1) \ldots \lambda(n)-\lambda(n-1)]$$

The lambda differentials may be plotted in a non-normal distribution, and then the characteristics of the distribution are determined at 808.

In one embodiment, determining a distribution curve based on extreme values may include a generalized extreme value (GEV) distribution:

$$f(x)|_{k,\sigma,\mu} = \begin{cases} \frac{1}{\sigma}e^{-(1+k(\frac{x-\mu}{\sigma}))^{-\frac{1}{k}}}\left(1+k\left(\frac{x-\mu}{\sigma}\right)\right)^{-\frac{1}{k}-1} \\ \quad \text{if} \quad \begin{array}{l} k<0 \text{ and } -\infty<x\leq\left(\mu-\frac{\sigma}{k}\right) \text{ or} \\ k>0 \text{ and } \left(\mu-\frac{\sigma}{k}\right)\leq x<+\infty \end{array} \\ 0 \\ \quad \text{if} \quad \begin{array}{l} k<0 \text{ and } x>\left(\mu-\frac{\sigma}{k}\right) \text{ or} \\ k>0 \text{ and } x<\left(\mu-\frac{\sigma}{k}\right) \end{array} \\ \frac{1}{\sigma}e^{-\frac{(x-\mu)}{\sigma}}e^{-e^{-\frac{(x-\mu)}{\sigma}}} \\ \quad \text{if } k=0, -\infty<x<+\infty \end{cases}$$

Where k is the shape, σ is the scale, and μ is the location of the distribution curve. The characteristics of the distribution may include the magnitude of a central peak and of a mode of the distribution. The mode is the value that occurs most frequently in the distribution, and the central peak is the percentage of the data samples that have that value. In a GEV distribution, the mode may be determined by the equation:

$$\text{Mode}[x] = \mu + \frac{\sigma}{k}[(1+k)^{-k}-1]$$

In this way, the mode may be a function of the shape (K), the location (Mu) and the standard deviation (Sigma) of the GEV function.

However, the method to estimate the mode may require extensive resources involving both memory and processor. For example, multi-step processes to estimate the shape of the distribution function for calculating the mode can be problematic. The steps for the estimation of the shape may be based on based on nonlinear optimization and often times converge only after hundreds iterations. One example of a non-reduced step method employs a two-step process to estimate the parameters. The first step is a one-dimensional search using a linearization of a Probability-Probability plot over the parameter K (the shape). The second step is a multidimensional search to maximize the log-likelihood with respect to K, log(sigma), and mu between the data and the GEV distribution function (defined earlier by f(x) for given k, sigma and mu). Calculating these parameters for a given data sample may result in relatively large computational resources, making it difficult to be implemented for an on-board application running in real-time In the present application a simplified reduced-step approach may be used to estimate the shape (k) based on which the detection-isolation of air-fuel sensor degradation can be performed by the control system, and the shape used as a surrogate for the mode. While a reduced-step method is described, additional steps may be added, if desired. The approach described below may converge in fewer iterations, reducing processing requirements of the control system. Further, faster estimation can improve accuracy and effectiveness of the diagnostic when implemented in the engine control system to be performed during engine operation in real-time.

The reduced-step approach is based on the particular operation of air-fuel ratio sensors, such as UEGO sensors, during operation in an engine exhaust. Specifically, it was discovered by the inventors that the decision on the type of distribution can be made using the estimate of the shape of the distribution function rather than the mode of the distribution. The detection-isolation of faults can then be made through this parameter, providing reduced computational processing in the particular example of a UEGO sensor monitoring system.

Further, the estimation of the parameter K (the shape) can be performed with reduced computational requirements through a golden section search over a range of values within which the optimal value (optimal shape) exists and is unique. The golden section search is a technique for finding the extremum (minimum or maximum) of a strictly unimodal function by successively narrowing the range of values inside which the extremum is known to exist.

This proposed method shows attractive convergence properties, fast estimation process and good accuracy compared to the two-step method described above. An advantage of this method is the feasibility of being implemented in the engine control system controller for online data processing and diagnostics in real-time during engine running operation.

In one example, the golden section search operates over a prespecified interval for the shape parameter (K). The process maximizes the Probability-Probability plot likelihood between the probability density function of the collected data (air-fuel ratio differentials) and the probability of the instrumental variable Z generated as $$Z = GEV^{-1}(Y, k, \sigma=1, \mu=0)$$

Where K is to be estimated through the iterative process and the artificial data (Y) is the ordered statistics data generated as $$Y = \frac{\left[\frac{1}{2} \frac{3}{2} \ldots (n-1) - \frac{1}{2}\right]}{(n-1)}$$

Here n is the length of $X_p$, with $X_p$ being the vector of the presorted differentials, defined as $$X_p = \Delta\lambda(k)|_{2 < k < n}$$

$$= [\lambda(2) - \lambda(1) \ldots \lambda(n) - \lambda(n-1)]$$

Wherein (X) is then obtained by sorting $X_p$ in ascendant order.

Pearson's correlation coefficient is used to measure the similarity between the PDF of (X) and the PDF of (Z) and is defined as $$\rho_{x,z} = \text{corr}(X, Z) = \frac{E[(X - E[X])(Z - E[Z])]}{\sigma_x \sigma_z}$$

The objective function to optimize is convex which means that the solution exists and is unique over the range of the possible K values. The algorithm may start searching for K given a wide interval of the shape between extremes. For example, an interval of −1 and 1 may be used.

Figure 10:
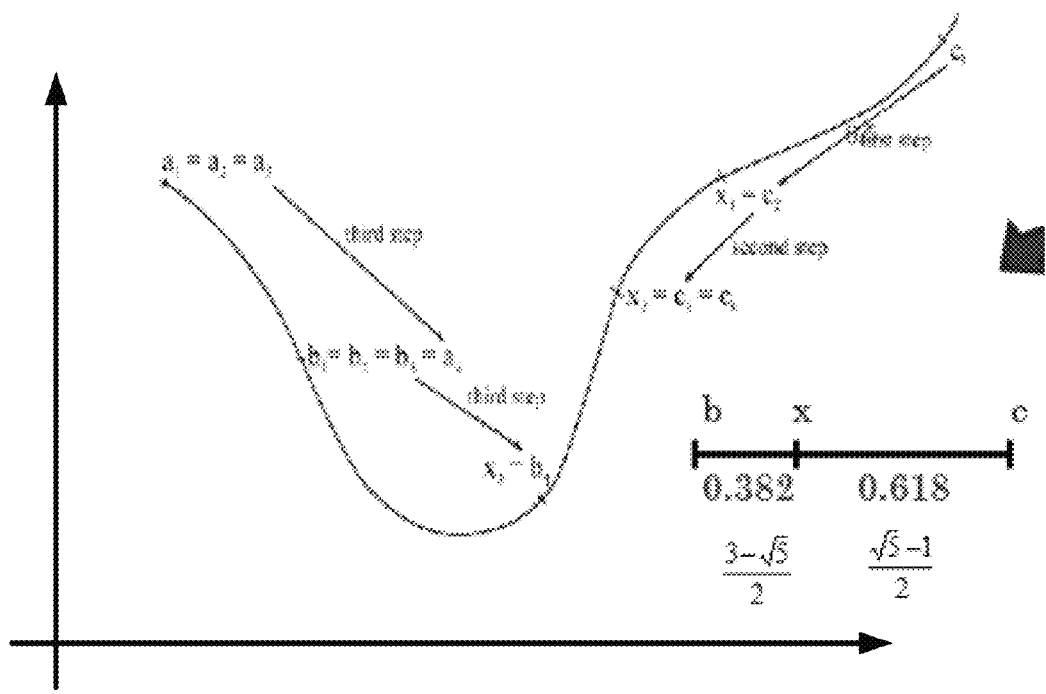
FIG. 10 illustrates an approach using a golden section search.
Figure 11:
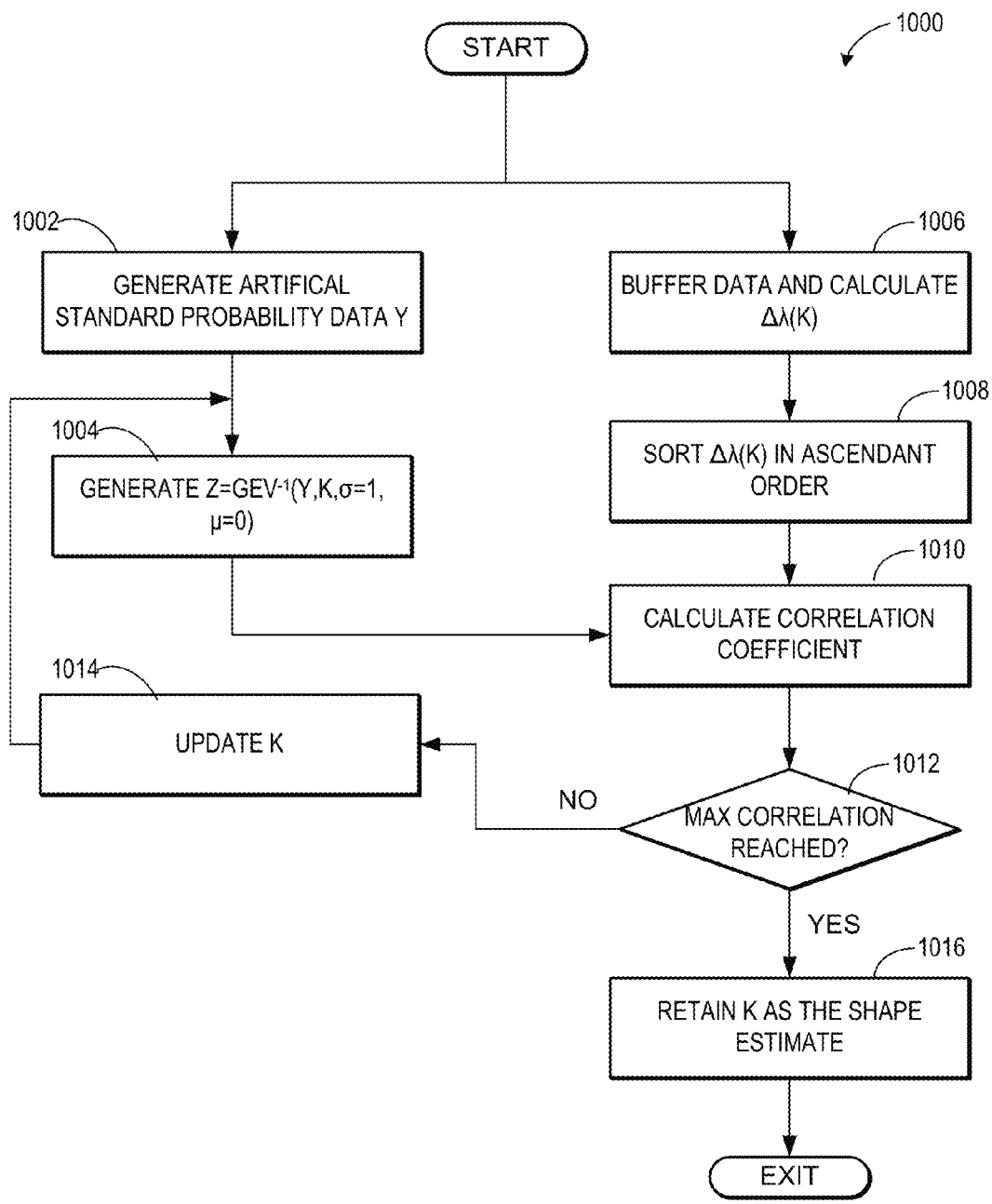
FIG. 11 shows a method for using a golden section search.

Specifically, FIG. 10 illustrates an approach using a golden section search, along with a corresponding method 1000 in FIG. 11. The golden section search finds the optimum of the objective function by successively narrowing the range of values inside which the optimal solution exists and is unique.

The method 1000 in FIG. 11 uses the above described equations to estimate the shape K.

At 1002 the method generates artificial standard probability data, Y. The method then proceeds to generate Z at 1004.

At 1006 the method buffers the data in memory and calculates $\Delta\lambda(K)$. The method then proceeds to 1008 and sorts the data calculated at 1006 in ascendant order.

At 1010, the method inputs the data from 1004 and 1006 and calculates the correlation coefficient.

At 1012, the method may determine if a maximum correlation is reached. If no, the method may proceed to 1014 and update the value of k before rejoining the method at 1004 to generate Z. The method updates the value K using a golden section search as illustrated in FIG. 10.

If yes at 1012, the method may proceed to 1014 and retain the K as the shape estimate and then end. The shape estimate is then passed to the other methods to identify one or more of the various types of degradation of the air-fuel ratio sensor.

Continuing with FIG. 8, as explained above, a sensor degradation behavior may be determined based on the characteristics of the distribution at 810 (see FIG. 9). For example, as will be explained in more detail below, the magnitude of the central peak (which indicates the degree of variation of the extreme lambda differentials) may indicate whether or not an asymmetric delay degradation behavior is present, as sensors with asymmetric delay type degradation may exhibit less variation than sensors without asymmetric delay. Additionally, the shape of the distribution may operate as a substitute for the magnitude of the shape (which indicates whether the sensor output is biased rich or lean) to indicate whether or not an asymmetrical response degradation behavior is present. By determining the magnitude of the central peak and the shape, as well as determining other sensor parameters as will be described in more detail below, the sensor can be classified into one or more of the six discrete degradation behaviors, or be classified as not degraded. Determining the sensor degradation behavior based on the characteristics of the distribution will be described in more detail with regard to FIG. 9.

In this way, it is possible, via the controller, to determine and then indicate each of at least the following different shapes based on the type of degradation:
 1. High Central Peak
 2. Asymmetric Distribution—Low Central Peak
 3. Symmetric Distribution—Low central Peak Specifically, the decision on whether there is degradation, and further the type (SYMD, SYMF, R2LF, L2RF, R2LD, or L2RD) can be based on two characteristic parameters of the distribution function: the magnitude of central Peak (CP) and the shape (K) as described herein.

Returning to method 800, at 812, the method comprises determining if sensor degradation is indicated. If no degradation is indicated (e.g., the characteristics of the distribution indicate that no degradation behavior is present), method 800 returns to continue to monitor the sensor. If degradation is indicated, method 800 proceeds to 814 to determine the whether the sensor degradation behavior exceeds a maximum value. As described above, sensor degradation may be indicated based on the characteristics of an extreme value distribution of lambda differentials. The characteristic that indicates degradation (e.g., the central peak or shape) may be analyzed to determine the extent of the degradation. For example, a central peak magnitude above a given first threshold may indicate an asymmetric delay degradation behavior. If the magnitude is above the first threshold by a sufficient amount, for example if it is 20% or more greater than the first threshold, the degradation behavior may exceed the maximum limit. If the degradation behavior exceeds the maximum value, this may indicate the sensor is damaged or otherwise non-functional and as such method 800 proceeds to 816 to notify an operator of the vehicle of the sensor degradation, for example by activating a malfunction indication light. If the degradation behavior does not exceed the maximum value, it may indicate that the sensor is still functional. However, to ensure adequate engine control to maintain engine emissions and fuel economy at a desired level, one or more engine operating parameters may be adjusted at 818, if desired. This may include adjusting fuel injection amount and/or timing, and may include adjusting control routines that are based on feedback from the degraded sensor to compensate for the identified degradation.

As explained above, method 800, as well as method 900 described with respect to FIG. 9 below, indicate sensor degradation based on characteristics of a distribution of extreme values of calculated lambda differentials collected during engine operation.

Turning to FIG. 9, a method 900 for determining sensor degradation behavior based on the characteristics of the extreme value distribution is depicted. Method 900 may be carried out as part of method 800, for example at 810 of method 800. Method 900 includes, at 902, determining if the central peak of the distribution is less than a first threshold. As explained above with respect to FIG. 8, the central peak is the percentage of the data samples that have the most common value. Because the distribution is based on lambda differentials, a relatively high amount of variation is expected in the distribution when the exhaust gas sensor is functioning normally. Thus, a lack of variation, which results in a high central peak, indicates sensor degradation. Specifically, a high central peak indicates an asymmetric delay behavior, wherein the time delay from when a commanded change in air/fuel ratio is received to when the change actually occurs is larger than expected. Because the delay is asymmetric, either more time will be spent at rich operation or more time will be spent at lean operation. In either case, less overall variation will be present. The first threshold may be determined in a suitable manner. In one embodiment, the distribution of the extreme values may be determined off-line for a new, non-degraded sensor, and the first threshold may be the central peak of the distribution of the non-degraded sensor. Further, the first threshold may be adjusted to either increase or decrease the sensitivity of the degradation detection. An example first threshold, T1, is illustrated in FIG. 12A.

If the central peak is not less the first threshold, an asymmetric delay sensor degradation behavior is indicated. Method 900 proceeds to 904 to determine if an expected lambda is greater than a determined lambda at idle, in order to determine which asymmetric degradation behavior is present. If the central peak is greater than the first threshold, the controller may determine a mean lambda for a given duration when lambda is idle. If the determined mean lambda value is less than the expected or commanded mean lambda value, this indicates more time is spent in rich operation than commanded, and as such method 900 includes indicating a rich-to-lean delay sensor degradation behavior at 906. If the determined mean lambda value is greater than the expected value, this indicates more time is spent in lean operation, and method 900 includes indicating a lean-to-rich delay sensor degradation behavior at 908.

Returning to 902, if the central peak is less than the first threshold, method 900 proceeds to 910 to determine if the shape of the distribution is less than a second threshold. A symmetric sensor, that is a sensor that does not display any asymmetric sensor degradation, will typically have a shape in a specified symmetric range, bounded by a second and third threshold. The second and third thresholds can be determined in a manner similar to the first, central peak threshold.

If the shape is smaller or larger than the symmetric range, asymmetric response type degradation behavior is indicated. If the shape is smaller than the symmetric range, that is if the shape is less than the second threshold, method 900 proceeds to 912 to indicate a rich-to-lean lag response degradation. In this case, the sensor experiences a delay in the response to a commanded rich to lean change, and thus spends less time at the commanded lean lambda, than at the commanded rich lambda. Thus, a greater amount of the lambda differentials will occur with values with a positive (lean) magnitude.

If the shape is not less than the second threshold, method 900 proceeds to 914 to determine if the shape is greater than the third threshold. If yes, the shape is therefore less than the symmetric range, and thus method 900 includes indicating a lean to rich lag response degradation at 916. If the shape is not greater than the third threshold, the shape is in the symmetric range. Based on the characteristics of the distribution, symmetric delay and response degradation as well as no degradation cannot be distinguished from each other.

To determine which symmetric condition the sensor is exhibiting, method 900 includes determining if the sensor time delay is greater than a nominal time delay at 918. The nominal sensor time delay is the expected delay in sensor response to a commanded air/fuel ratio change based on the delay from when the fuel is injected, combusted, and the exhaust travels from the combustion chamber to the exhaust sensor. The determined time delay may be when the sensor actually outputs a signal indicating the changed air/fuel ratio. If the time delay is greater than the nominal time delay, method 900 proceeds to 920 to indicate a symmetric delay.

If the time delay is not greater than the nominal time delay, method 900 proceeds to 922 to determine if a time constant of the sensor is greater than a nominal time constant. The nominal time constant may be the time constant indicating how quickly the sensor responds to a commanded change in lambda, and may be determined off-line based on non-degraded sensor function. If the determined time constant is greater than the nominal time constant, it indicates a slow response rate, and thus at 924, if the time constant is greater than the nominal time constant, a symmetric response degradation behavior is indicated.

If the time constant is not greater than the nominal time constant, method 900 includes indicating no degradation at 926. No degradation is indicated due to the characteristics of the distribution indicating a symmetric behavior of the sensor, and both the sensor time constant and delay being similar to the nominal time constant and delay. Upon indicating a sensor behavior, whether one of the six discrete degradation behaviors or the no degradation behavior, method 900 exits.

Thus, the methods described with respect to FIGS. 8 and 9 provide for monitoring an exhaust gas sensor, in order to determine a sensor degradation behavior. If sensor degradation is determined, the severity of the degradation may be evaluated. If the degradation is severe, replacement/repair of the sensor may be indicated to an operator of the vehicle. If the degradation is less severe, the current sensor may continue to be operated. However, the control routines involving the sensor may be adapted based on the degradation. For example, the time constant and/or delay constant of the sensor used in feedback control of the air/fuel ratio may be adjusted. Further, as fuel injection timing and amount is determined based on feedback from downstream exhaust gas sensors, the amount and/or timing of the fuel injected may be adjusted to maintain engine control and vehicle emissions in a desired range.

Further, the method of FIGS. 8 and 9 non-intrusively monitor the exhaust gas sensor by collecting data during steady state operating conditions. However, in some embodiments, the engine may purposely be commanded to operate rich or lean while executing the methods. This type of operation may be used to validate the determination of the sensor degradation based on the characteristics of the distribution as described.

Figure 12:
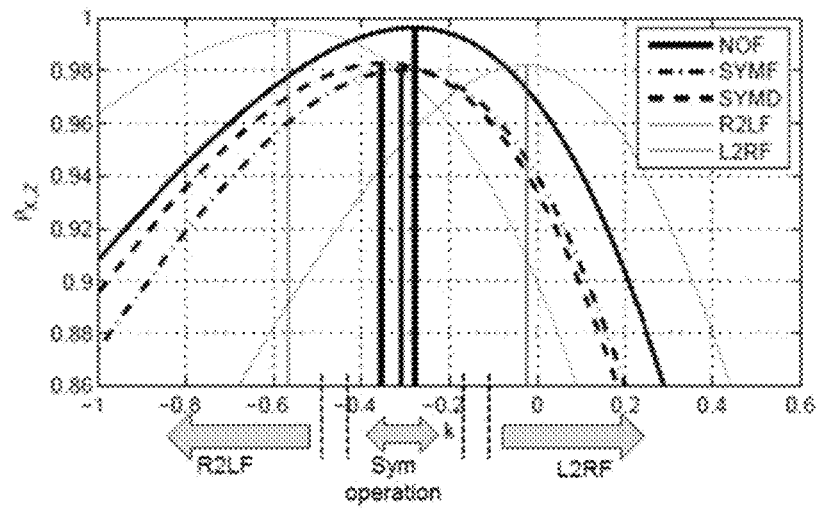
FIG. 12 shows a graph illustrating the Pearson correlation coefficient.

Turning to FIG. 12 an example graph for a Pearson's correlation coefficient is shown as a function of the shape for different fault types. The magnitude of the faults is 500 ms. The figure illustrates the lean to rich filter (L2RF), rich to lean filter (R2LF), symmetrical delay (SYMD), symmetrical filter (SYMF), and no fault (NOF). The data in this example was collected from a sample V-6 engine. This figure shows the variation of the correlation coefficient as a function of the shape parameter K for various fault types with the same fault magnitude. From this example, the symmetrical operation (NOF, SYMF, SYMD) have a comparable magnitude shape whereas the R2LF operation coefficient is relatively smaller and the L2RF coefficient is relatively larger. The choice of the thresholds, an example shown in FIG. 14 (beta_1) and (beta_2), illustrate the thresholds of separation between the types of faults and allow isolating the asymmetric filter faults from the symmetric operation modes.

Figure 13:
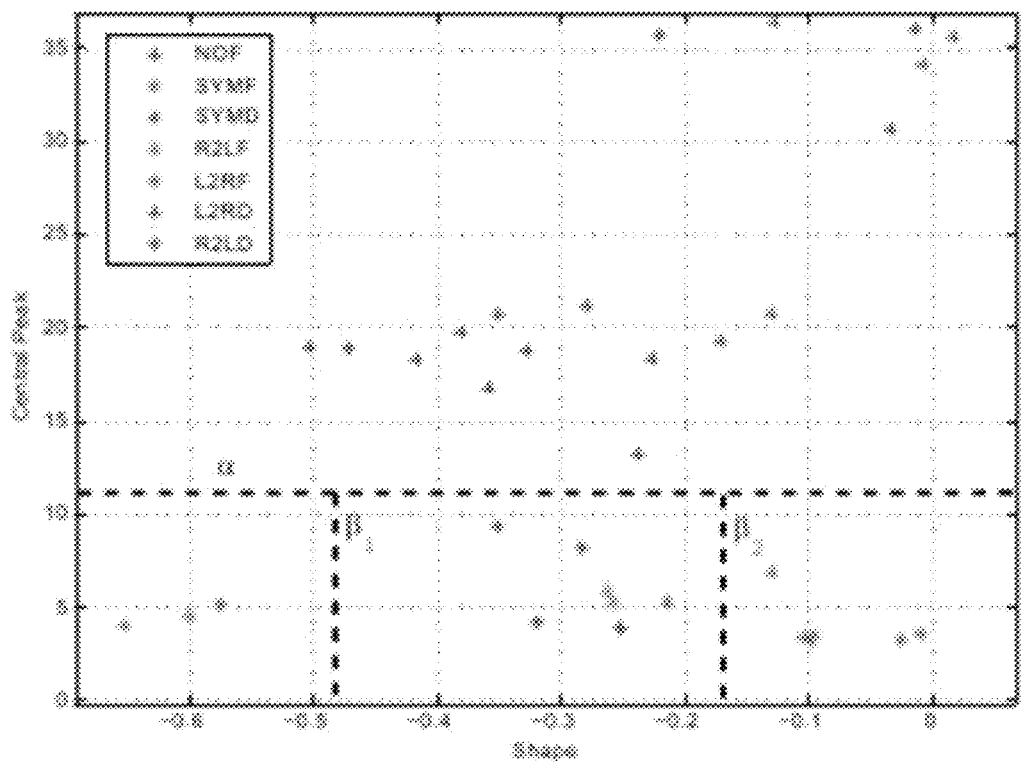
FIG. 13 shows a chart illustrating the central peak versus shape.

Turning now to FIG. 13 an example of the central peak versus shape calculated for the various faults, various magnitudes, and road conditions is shown. The example data shown here was collected using a V8-5 L engine. The abbreviations are the same as used in FIG. 13. Additionally, the figure illustrates the lean to rich delay (L2RD) and rich to lean delay (R2LD). The decision thresholds alpha $\alpha$, beta 1 $\beta_1$, and beta 2 $\beta_2$ are shown with dashed lines. The SYMD, NOF, and SYMF fall within the portion of the graph bordered by the x axis, $\beta_1$, $\beta_2$, and a. The R2LF falls within the portion of the graph bordered by the x axis, $\alpha$, $\beta_1$, and the y axis. The L2RF falls within the portion of the graph bordered by the x axis, $\alpha$, $\beta_2$ and the y axis. The L2RD and R2LD both occur above the a line with the R2LD showing the highest magnitude central peaks.

Figure 14:
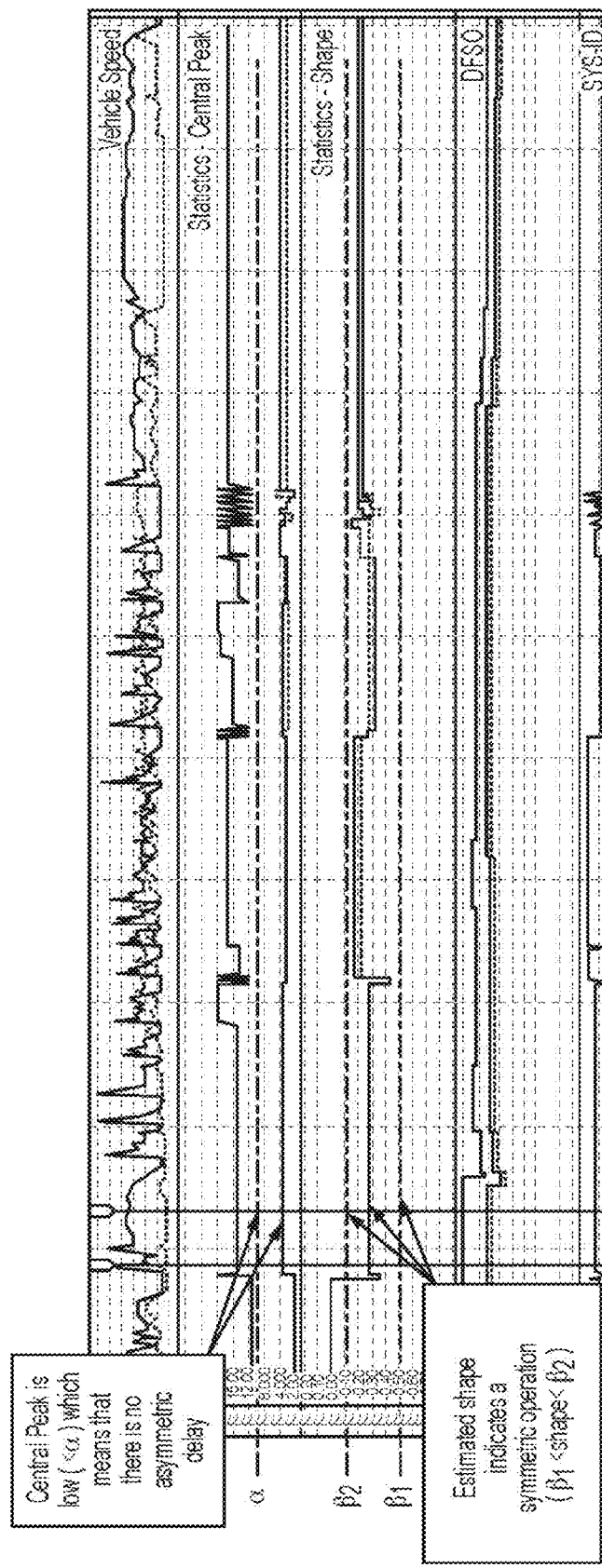
FIG. 14 shows a graph for a first test.
Figure 15:
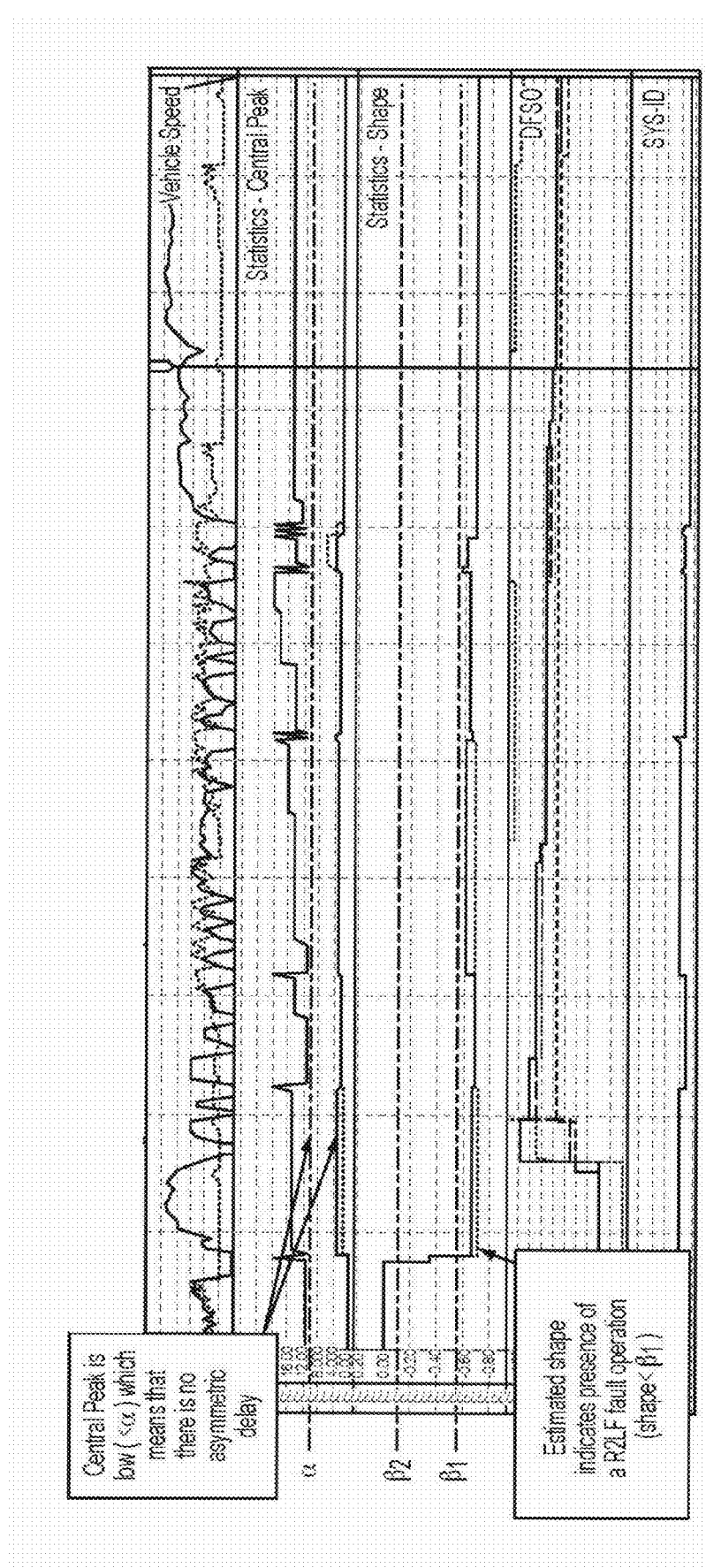
FIG. 15 shows a graph for a second test.

FIGS. 14 and 15 show examples of the diagnostics results obtained using the proposed shape estimation process.

FIG. 14 shows a first test which is a symmetric filter (lag) fault. The decision thresholds were selected as $\alpha=10$, $\beta_1=-0.1$, and $\beta_2=-0.5$. The graph shows the diagnostics results for Bags 4, 5 and highway, and hot start. The magnitude of the faults is 1200 ms. Shown in the graph is a top line for vehicle speed, then a statistics central peak, then a statistics shape, a DFSO, and a SYS ID. The decision threshold are shown as dotted lines and labeled accordingly. The central peak is low showing that there is no asymmetric delay. The estimated shape indicates a symmetric operation, the shape falling between the $\beta_1$ and $\beta_2$.

FIG. 15 shows a second test which is a R2LF fault. The decision thresholds were selected as $\alpha=10$, $\beta_1=-0.55$, and $\beta_2=-0.1$. The graph shows the diagnostics results for Bags 1, 2 and CD533, and cold start. The magnitude of the faults is 900 ms. Shown in the graph is a top line for vehicle speed, then a statistics central peak, then a statistics shape, a DFSO, and a SYS ID. The decision threshold are shown as dotted lines and labeled accordingly. The central peak is low showing that there is no asymmetric delay. The estimated shape indicates a presence of a R2LF fault operation, the shape being less than $\beta_1$.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of monitoring an exhaust gas sensor coupled in an engine exhaust, comprising:
   indicating, via a controller coupled to the exhaust gas sensor, a type of exhaust gas sensor degradation based on a shape of a distribution of extreme values of a plurality of sets of lambda differentials collected by the controller based on readings from the exhaust gas sensor during selected operating conditions, the shape identified via the controller based on an iterative search that successively narrows a range of values inside which the shape exists.

2. The method of claim 1, wherein the distribution is a generalized extreme value (GEV) distribution, and wherein the degradation is further based on a central peak of the GEV distribution.

3. The method of claim 2, wherein if a magnitude of the central peak is greater than a threshold, indicating an asymmetric delay sensor degradation.

4. The method of claim 3, wherein if an expected mean air/fuel ratio is greater than a determined mean air/fuel ratio at idle, indicating a rich to lean delay sensor degradation, and if the expected mean air/fuel ratio is less than the determined mean air/fuel ratio at idle, indicating a lean to rich delay sensor degradation.

5. The method of claim 3, wherein if the magnitude of the central peak is less than the threshold and the shape is outside a symmetric range, indicating an asymmetric response sensor degradation.

6. The method of claim 5, wherein if the shape is less than the symmetric range, indicating a rich to lean response sensor degradation, and if the shape is greater than the symmetric range, indicating a lean to rich response sensor degradation.

7. The method of claim 5, wherein if the shape is in the symmetric range, indicating no degradation or a symmetric sensor degradation.

8. The method of claim 7, further comprising indicating a symmetric delay sensor degradation if a determined time delay is greater than a nominal time delay, and indicating a symmetric slow response sensor degradation if a determined time constant is greater than a nominal time constant.

9. The method of claim 1, wherein the selected operating conditions further comprise steady state operating conditions.

10. The method of claim 1, further comprising adjusting, via the controller, a fuel injection amount and/or timing based on the indicated type of exhaust gas sensor degradation, wherein the shape is based on a golden section search of data sorted in an ascending or descending order.

11. A system for a vehicle, comprising:
an engine including a fuel injection system;
an exhaust gas sensor coupled in an exhaust system of the engine; and
a controller including instructions executable to:
indicate exhaust gas sensor degradation based on an iteratively identified shape of a distribution of extreme values of a plurality of sets of lambda differentials collected during steady-state engine operation; and
adjust an amount and/or timing of fuel injection based on the indicated sensor degradation.

12. The system of claim 11, wherein the instructions are further executable to notify an operator of the vehicle if the indicated sensor degradation exceeds a threshold.

13. The system of claim 11, wherein the shape is determined from a golden section search.

14. A method of monitoring an oxygen sensor coupled in an engine exhaust, comprising:
indicating, via a controller coupled to the oxygen sensor, an asymmetric delay sensor degradation if a shape of a distribution of extreme values of a plurality of sets of lambda differentials exceeds a first threshold; and
indicating, via the controller, an asymmetric slow response sensor degradation if the shape is below the first threshold and a second characteristic of the distribution is outside a second threshold range, the shape based on successively narrowing a range of values in which the shape is located.

15. The method of claim 14, wherein the indications are further based on a magnitude of a central peak of the distribution.

16. The method of claim 15, wherein the shape is based on a golden section search.

17. The method of claim 16, wherein a larger shape value indicates lean-to-rich sensor degradation asymmetry, and a smaller shape value indicates rich-to-lean degradation asymmetry.

18. The method of claim 14, further comprising adjusting, via the controller, a fuel injection amount based on the indicated sensor degradation.

19. The method of claim 14, wherein the lambda differentials are collected during steadystate operating conditions.

* * * * *